(No Model.)

J. DAY.
CURTAIN ROD.

No. 549,768. Patented Nov. 12, 1895.

WITNESSES:

INVENTOR
John Day,
BY Briesen & Knauth
his ATTORNEYS

UNITED STATES PATENT OFFICE.

JOHN DAY, OF NEW YORK, N. Y.

CURTAIN-ROD.

SPECIFICATION forming part of Letters Patent No. 549,768, dated November 12, 1895.

Application filed February 26, 1895. Serial No. 539,746. (No model.)

*To all whom it may concern:*

Be it known that I, JOHN DAY, a resident of the city, county, and State of New York, have invented certain new and useful Improvements in Extensible Curtain-Rods, of which the following is a specification.

My invention has particular reference to improvements in curtain-rods, and is directed mainly to the production of a simple, cheap, and efficient extensible rod wherein rigid joints may be provided between the various sections of the rod and by which the rod is maintained in position for use.

To this end my invention consists in the construction and arrangement hereinafter set forth and claimed.

My invention will be understood by reference to the accompanying drawings, in which—

Figure 1:
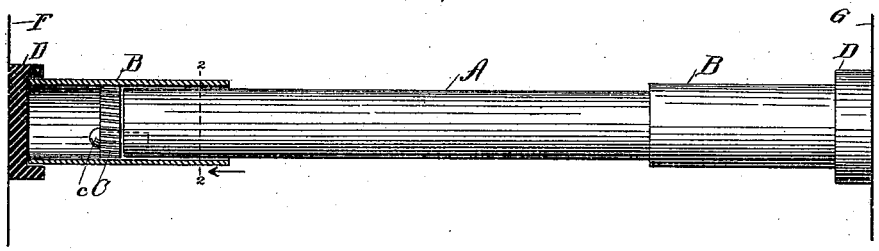
Figure 2:
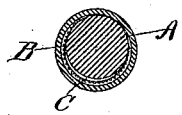
Figure 3:
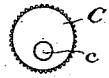

Figure 1 represents a curtain-rod of the type designed to be held self-sustaining between opposing surfaces, showing my invention applied thereto. Fig. 2 is a section on line 2 2 of Fig. 1, looking in the direction of the arrow. Fig. 3 is a detail view of an engaging device hereinafter referred to.

In the drawings, F G are two opposing surfaces between which the rod is held self-sustaining. The rod consists of a series of telescopic sections—as a rod-section A, carrying at one or both ends imperforate sleeves B, each of which sleeves may, if desired, be provided with a cushion D to bear against a suitable surface. Carried by the end of the rod-section which is entered into a sleeve B is an eccentrically-mounted engaging device, shown in the present instance as a serrated wheel or roller C, hung upon a pin $c$, which is fixed in the rod-section A and eccentric to the axis thereof. This engaging device is of approximately the same diameter as the internal diameter of a tube or sleeve B, so as to engage with the inner wall thereof.

The manner of using my device is as follows: The rod is put in place, it being concentric with the wheel C. When the rod proper has been adjusted to a proper length, the rod-section A is turned upon the pin $c$ as an axis, which action has the effect, by reason of the eccentricity of the position of the pin $c$, of causing the rod-section A to bear firmly against the inner wall of the tube or sleeve B throughout the entire length of the portion of the rod-section A, which is entered into the sleeve, and also to cause the engaging device or roller C to bear firmly against the inner wall of the sleeve. It will thus be seen that the effect is practically as though the rod-section A had been introduced into the sleeve B and then expanded to entirely fill the bore of the tube. It will likewise be noticed that the rod-section A, being made to bear against the wall of the tube throughout the entire length of the inserted portion of the rod-section, there will be a long frictional surface thereby brought in contact with the inner wall of the tube, which will produce a very secure joint and prevent any lateral motion of the rod-section in the tube.

By my invention I am enabled to produce a simple, cheap, and efficient curtain-rod, wherein a rigid connection is had between the rubber tips D, or such other means as may be employed to contact with the supports, and every other portion of the rod. Furthermore a smooth imperforate rod is provided wherein no projections extend from the surface of the rod to obstruct the sliding movement of the rings thereon, and one which can be held in place by a positive pressure.

I am aware that extensible curtain-rods have been heretofore devised, and such I do not claim broadly; but What I do claim, and desire to secure by Letters Patent, is—

In an extensible curtain rod, the combination with rigid means carried at each end thereof and adapted to bear against fixed supports and to be held in place by a positive pressure exerted thereon by the rod proper, a tube which constitutes one of a series of telescopic sections, a rotatable longitudinally movable rod-section of substantially the same diameter as the internal diameter of said tube and forming another section of the rod proper, a pivot seated in said rod section eccentric to the axis thereof, and a wheel of substantially the same diameter as the rod section hung eccentrically on and carried by the said pivot, the circumference of the wheel being adapted to align with that of the rod whereby the parts may be moved longitudinally with relation to each other, and when the rod section is turned with relation to the tube the rod section is forced to reach contact therewith and form a rigid connection between all the parts to hold the rod proper in place by positive pressure, substantially as described.

JOHN DAY.

Witnesses:
 HARRY M. TURK,
 GEORGE E. MORSE.